United States Patent Office 3,769,253
Patented Oct. 30, 1973

3,769,253
PRIMER COMPOSITION FOR HEAT CURABLE SILICONE RUBBERS
Joseph Eugene Stevenson, Charleston, S.C., assignor to Stauffer Chemical Company
No Drawing. Continuation-in-part of application Ser. No. 70,196, Sept. 8, 1970, which is a continuation of application Ser. No. 716,340, Mar. 27, 1968, both now abandoned. This application Apr. 5, 1972, Ser. No. 241,421
Int. Cl. C08c 11/22
U.S. Cl. 260—33.6 SB                    4 Claims

ABSTRACT OF THE DISCLOSURE

A primer composition for bonding a heat curable silicone rubber to a metal or fabric substrate, said composition comprising an alkenyl acyloxysilane, an organic peroxide, a silicone polymer substantially free of hydroxyl groups containing from 0.01 to about 5.0 mole percent of unsaturated hydrocarbon groups and a hydrocarbon or halogenated hydrocarbon solvent.

---

This application is a continuation-in-part of my copending application Ser. No. 70,196, filed on Sept. 8, 1970, now abandoned, which was a streamlined continuation of my application Ser. No. 716,340, filed on Mar. 27, 1968 and now abandoned.

The present invention relates to primer compositions and more particularly to primer compositions for bonding heat curable silicone rubbers to substrates.

Heretofore, silicone rubbers have been bonded under heat and pressure to substrates by coating the substrates with various alkyl acyloxy- or alkyl alkoxysilanes prior to the application of the silicone rubbers. Among the silanes which have been used as primers are tetraethyl orthosilicates, t-butoxytriethoxysilanes, methyltriethoxysilanes, methyltriacetoxysilanes, ethyltriacetoxysilanes, propyltriacetoxysilanes and the like.

However, the heretofore known primers have a tendency to migrate on the substrate surface when pressure is applied in the application of heat curable rubbers. Also, substrates which have been coated with the conventional primers do not provide good day-to-day reproducibility, especially when stored for long periods of time. In addition to the disadvantages enumerated above, these primers exhibit an extensive wicking effect.

Therefore, it is an object of this invention to provide unique primer compositions for substrates. Another object of this invention is to provide primer compositions for heat curable silicone rubbers. Still another object of this invention is to provide primer compositions for bonding heat curable silicone rubbers to fabrics. Still another object of this invention is to provide primer compositions which will not migrate on the substrate surface when subjected to pressure in the application of heat curable silicone rubbers. A further object of this invention is to provide primer compositions which are reproducible on a day-to-day basis and are stable even when stored for long periods of time. A still further object of this invention is to provide primer compositions which are substantially non-wicking and have better calenderability. A still further object of this invention is to provide an article having heat curable silicone rubbers bonded thereto.

The foregoing objects and others which will become apparent from the following discussion are accomplished in accordance with this invention, generally speaking, by providing compositions which may be used for bonding heat curable silicone rubbers to various substrates. The compositions of this invention comprise a silicone polymer solution, catalyst and a silane of the formula $$R_nSi(OOCR')_{4-n}$$

in which R is an alkenyl radical having from 1 to 10 carbon atoms; R' is an alkyl group having from 1 to 5 carbon atoms; and $n$ is an integer of from 1 to 2.

Referring to the above formula, R is an unsaturated hydrocarbon chain which may be open or closed, that is to say, it may be unsaturated straight-chain aliphatic hydrocarbon or an unsaturated cycloaliphatic hydrocarbon. The hydrocarbon will contain at least one double bond and will contain from about 2 to 10 carbon atoms and more preferably from about 2 to 6 carbon atoms. Examples of such unsaturated hydrocarbon chains are vinyl, 1-propenyl, 2-propenyl, isopropenyl, 1-butenyl, 2-butenyl, 3-butenyl, 1-isobutenyl, 2-isobutenyl, 1-sec-butenyl, 2-sec-butenyl, 1-methyl-2-propenyl, 1-pentenyl, 2-pentenyl, 4-pentenyl, 1-hexenyl, 3-hexenyl, 5-hexenyl; corresponding branched-chain isomers such as 3,3-dimethyl-1-butenyl, 2,3 - dimethyl-1-butenyl, 2,3 - dimethyl-2-butenyl, 2,3-dimethyl-3-butenyl, 1 - methyl-1-ethyl-2-propenyl, and the various isomers of heptenyl, octenyl, nonenyl, decenyl, cyclo-hexenyl, bicyclo-heptenyl, cyclo-pentadienyl, butadiene, and the like. Preferably, R is a vinyl group. In the foregoing formula, R' is an alkyl group, preferably a lower alkyl group, containing from 1 to 5 carbon atoms, such as methyl, ethyl, propyl, butyl, pentyl, and the like. Exemplary of the suitable compound is vinyltriacetoxysilane.

A solution of the primer compositions of this invention is prepared by dissolving a silicone polymer in an organic solvent in a concentration of from about 1 to about 30 percent, and thereafter adding an alkenyl acyloxysilane and a curing catalyst with agitation. The primer composition may be applied to the substrate by spraying, dipping, brushing, and wiping, and in the case of fabrics, impregnated with the solution and thereafter dried. Preferably, the primer composition is dried prior to the application of the silicone rubber. Generally, the dried primer composition is interposed between the silicone rubber and the substrate so that when the rubber and substrate are brought together and heated under pressure, extremely good bonding between the rubber and the substrate is affected.

It is preferred that the primer composition be applied in a solvent solution containing from about 1 to 30 percent by weight of the silane and more preferably from about 2 to 5 percent by weight of the silane and from 1 to 30 percent by weight of the silicone polymer. Examples of suitable solvents which may be used are aromatic hydrocarbons, such as benzene, toluene, xylene, naphthylene, and the like; halogenated aromatic hydrocarbons, such as chlorobenzene; aliphatic hydrocarbons, such as pentane, hexane, octane, decane; and halogenated aliphatic hydrocarbons, such as methylene chloride, carbon tetrachloride, perchloroethylene, and the like.

The drying rate of the primer compositions are primarily dependent upon two factors. One factor is the rate of condensation of the silane or partial hydrolyzates thereof which is dependent first on the size of the R and R' radicals and second, on the amount of water present for the hydrolysis of the R' radicals to volatile acids. Where R and R' are larger than the claimed limits, the rate of hydrolysis and condensation of the silanes is reduced to the point where the primer compositions do not dry satisfactorily. Where the silane is exposed to water as, for example, in the form of steam, hydrolysis and condensation may be accelerated.

The other factor which may influence the drying rate is the presence or absence of a solvent. If a solvent is employed, the volatility of the solvent effects the drying rate of the primer coating. Thus, the solvent should be sufficiently volatile to evaporate at least as rapidly as the silane can hydrolyze and condense under the coating conditions.

Due to the possible variations of the two factors above, it is impossible to set limits on the drying time for the coating which may vary from a few seconds to several hours.

Heat curable silicone rubbers are elastomeric organosilicone polymers, that is to say, organopolysiloxanes which upon heating in combination with an appropriate curing catalyst are converted to the solid elastomeric state. Since the heat and pressure employed during the bonding operation of the present invention may be relied upon to convert the organopolysiloxane to the solid elastomeric state, the organopolysiloxane actually employed in making this assembly may be and preferably is in the uncured state, that is to say, convertible state.

The silicone polymers and heat curable silicone rubbers are well known to those familiar with the art. They may be described as polysiloxanes which are substantially free of hydroxyl groups and contain hydrocarbon radicals, silicon, and oxygen atoms. These silicone polymers and rubbers have recurring structural units of the formula:

wherein R″, which may be the same or different, are monovalent hydrocarbon groups, such as alkyl, aryl, aralkyl, alkaryl, cyclic, and alkenyl radicals. Examples of suitable alkyl radicals are methyl, ethyl, propyl, butyl, hexyl, etc.; aryl radicals are phenyl, naphthyl, etc.; aralkyl radicals are benzyl, phenethyl, etc.; alkaryl radicals are tolyl, etc.; cyclic radicals are cyclopentyl, cyclohexyl, etc.; and alkenyl radicals, such as vinyl radicals. In addition, R″ may represent halogenated monovalent hydrocarbon groups, such as fluoromethyl, fluorophenyl, tetrafluoroethyl, trifluorovinyl, trifluorotolyl, hexafluoroxylyl, heptafluoropropyl, and the like. Preferably, the R″(s) are the same and are lower alkyl radicals. The silicone polymers are used in the primer composition in an uncured state, that is to say, convertible state.

In the preferred embodiment, the polysiloxanes have an average ratio of hydrocarbon groups to silicon atoms of from about 1.9 to about 2.0 hydrocarbon groups and more preferably the polysiloxane contains an average of from 1.98 to 2.0 hydrocarbon groups per silicon atom. It is preferred that these polysiloxanes contain from about 0.01 to 5.0 mol percent and more preferably from 0.05 to 2.0 mol percent of silicon bonded unsaturated hydrocarbon groups such as vinyl, allyl and the like. Examples of suitable silicone polymers and heat curable silicone rubbers are methyl vinyl silicone rubber, methyl phenyl vinyl silicone rubber, and the like. The specific silicone polymer or rubber employed in accordance with the present invention is not critical and may be selected from any of the well-known varieties.

As is conventional, the silicone rubbers are mixed with curing catalysts, such as benzoyl peroxide, di-t-butyl peroxide, 2,4-dichlorobenzoyl peroxide, 2,5 - bis(t-butylperoxy)-2,5-dimethylhexane, and a filler, if desired, and then applied to the primed substrate.

Any of the conventional fillers may be incorporated in the silicone rubber. Among the fillers which may be employed are fumed and precipitated silicas, such as Cab-O-Sil, QUSO, Hi-Sil, Santocel, diatomaceous earths, clays, lithopone, ferric oxide, titanium dioxide, talc, zinc oxide, various forms of carbon, etc. The filler may be incorporated in amounts ranging from about 10 to 90 percent, preferably from about 25 to 75 percent of the total weight of the silicone rubber and the filler.

The primer composition may be applied directly to greige goods, although it may be beneficial to treat a sized fabric with heat and/or a solvent prior to the application of the primer. Following the removal of the sizing agent, the fabric may be dip coated or otherwise impregnated with the primer composition and dried at sufficient temperature and humidity to volatize off the solvent and cause hydrolysis and condensation of the silane. After the primer composition is dried, the silicone rubber may be applied to the coated fabric.

In another embodiment of this invention, it is preferred that fluorinated silicone polymers be used in the primer compositions where it is desirable to promote adhesion of fluorinated silicone rubbers to metal substrates. Before the primer compositions are applied to metal substrates, they should be clean and free from loose oxide scale. This may be accomplished by several methods known to those skilled in the art. For example, the surface may be first degreased as by dipping the metal substrates in a degreasing solution or by subjecting the substrates to vaporized degreasing materials, such as trichloroethylene. Following the degreasing operation, they may be further cleaned by scouring, heating or by blasting the surface with conventional materials, such as steel, shot, grit, sand, and the like.

In bonding silicone rubbers to the primed substrates, the temperature employed during the bonding operation may vary somewhat depending upon the nature of the silicone rubbers, the type of catalysts, and the substrates to which they are being bonded. In the case of fabrics, generally temperatures ranging from about 100° to about 300° C. may be employed. However, sufficient time should be allowed to cure the rubber and to provide for the bonding of the silicone rubbers to the substrates, which may range from about 1 minute to about 48 hours, including any postcure. In general, the coated fabric is press cured for about 10 minutes at a temperature of about 116° C. and then postcured for an additional 4 hours at a temperautre of about 205° C. The pressure employed may also vary and may be as low as that merely required to provide intimate contact, that is, a few pounds per square inch. The upper limit of pressure is not critical and pressures as high as a few thousand pounds per square inch may be used.

The bond provided by the press cure may be further improved by additional curing at higher temperatures for longer periods of time. For example, the assembly may be heated for several hours at a temperature of from about 150° to about 300° C. by placing it in an oven through which hot air is circulated.

Substrates may be coated with the primer compositions of this invention and stored for up to 3 months and thereafter coated with the silicone rubber in the conventional manner.

In using the primer compositions of this invention, it has been found that silicone rubbers and flourinated silicone rubbers may be bonded to a wide variety of substrates, such as metals and fabrics containing synthetic fibers, such as nylon, Nomex, asbestos, Dacron, as well as glass fibers.

The primer compositions of this invention provide a protective coating for the substrates, which are not effected by boiling water even in the presence of detergents; resist abrasion, and are highly resistant to heat. In addition, the primer compositions do not migrate on the surface of the substrate when silicone rubbers are applied under pressure, thus providing for greater adhesion between the silicone rubbers and the substrates.

Various aspects of the invention are further illustrated by the following examples in which all parts are by weight unless otherwise specified.

EXAMPLE 1

A primer composition is prepared by adding 5 parts of methyl vinyl silicone polymer to about 92 parts of toluene and mixed until smooth. About 4 parts of vinyltriacetoxysilane and about 0.18 part of benzoyl peroxide powder are added to the solution and mixed until a uniform dispersion is formed. A fabric, previously treated with acetone and dried, is dipped in the dispersion and then dried at about 30° C. at a relative humidity of at least 50 percent for about 1 hour.

A methyl vinyl silicone rubber stock catalyzed with 2,4-dichlorobenzoyl peroxide is applied to the treated fabric and press cured for about 10 minutes at about 116° C. and then postcured for 4 hours at about 205° C. The bond between the silicone rubber and fabric is measured by a conventional stripping test, ASTM D429–58, Method "B" Modified 180°. The results which are illustrated in Table I, show in a majority of the tests a cohesive failure in the silicone rubber.

TABLE I

Bond strength (p.p.i.)

| Substrate | Press cured, 10 min./ 116° C. | Postcure, 4 hrs./ 205° C. |
| --- | --- | --- |
| Nylon | 22(c) | 27(c) |
| Nomex [1] | 18(c) | 21(c) |
| Dacron | 8(a) | 25(c) |
| Asbestos | 15(a) | 20(a/c) |
| Glass fiber | 16(a) | 25(c) |

[1] Du Pont trademark.
(a) Adhesive failure.
(c) Cohesive failure.
(a/c) Adhesive and cohesive failure.

EXAMPLE 2

(a) A solution of the primer composition is prepared by adding 10 parts of methyl vinyl silicone polymer to about 87 parts of toluene and mixed until smooth. About 4 parts of vinyltriacetoxysilane and about 0.36 part of benzoyl peroxide powder are added to the solution and mixed until a uniform dispersion is formed. A fabric, previously treated with acetone and dried, is dipped in the dispersion and then dried at about 30° C. at a relative humidity of at least 50 percent for about 1 hour.

A methyl vinyl silicone rubber stock catalyzed with 2,4-dichlorobenzoyl peroxide is applied to the coated fabric and press cured for about 10 minutes at 116° C. and then postcured for an additional 4 hours at about 205° C. The bond between the silicone rubber and the fabric is measured by the conventional stripping test, ASTM D429–58, Method "B" Modified 180°. The results illustrated in Table II show a cohesive failure of the silicone rubber in a majority of the tests.

TABLE II

Bond strength (p.p.i.)

| Substrate | Press cured, 10 min./ 116° C. | Postcured, 4 hrs./ 205° C. |
| --- | --- | --- |
| Nylon | 33(c) | 35(c) |
| Nomex [1] | 22(c) | 30(c) |
| Dacron | 25(c) | 25(c) |
| Asbestos | 17(a) | 21(a/c) |
| Glass fiber | 25(c) | 25(c) |

[1] Du Pont trademark.
NOTE.—See footnotes (a) (c) (a/c) bottom of Table I.

(b) A primer composition prepared in accordance with the procedure described above is applied to several previously degreased and dried metal substrates and dried for about 1 hour at 30° C. in a relative humidity of about 50 percent. A methyl vinyl silicone rubber stock catalyzed with 2,4-dichlorobenzoyl peroxide is applied to each of the primed substrates, press cured for 10 minutes at 116° C. and then postcured for 24 hours at 249° C. The bond between the silicone rubber and the metal substrates is measured by the 90° stripping test, ASTM D429–58, Method "B." The results are illustrated in Table III.

TABLE III

| Substrate | Press cured, 10 min./ 116° C. | Postcured, 4 hrs./ 205° C. |
| --- | --- | --- |
| Steel | 28(c) | 28(c) |
| Stainless-steel | 32(c) | 29(c) |
| Copper | 32(c) | 15(a) |
| Brass | 32(c) | 8(a) |
| Aluminum | 24(c) | 27(c) |
| Titanium | 29(c) | 24(c) |

NOTE.—See footnotes (a) (c) (a/c) bottom of Table I.

(c) In accordance with the procedure described in Example 2(a) above, trifluorovinyl silicone polymers are substituted for the methyl vinyl silicone polymer. The primer composition is applied and dried on previously degreased metal substrates. A trifluorovinyl silicone rubber stock catalyzed with 2,4-dichlorobenzoyl peroxide is applied to the primed substances and press cured for 10 minutes at 116° C. and then postcured for 24 hours at 249° C. The bond strength between the silicone rubber and the metal substrate is illustrated in Table IV (qualitative test).

TABLE IV

Bond Strength (p.p.i.)

| Substrate | Press cured, 10 min./ 116° C. | Postcured, 4 hrs./ 205° C. |
| --- | --- | --- |
| Steel | (c) | (c) |
| Stainless-steel | (c) | (c) |
| Copper | (c) | (a) |
| Brass | (c) | (a) |
| Aluminum | (c) | (c) |
| Titanium | (c) | (c) |

NOTE.—See footnotes (a) (c) bottom of Table I.

EXAMPLE 3

A solution of the primer composition is prepared by adding 15 parts of methyl vinyl silicone polymer to about 82 parts of toluene and mixed until smooth. About 4 parts of vinyltriacetoxysilane and about 0.54 part of benzoyl peroxide powder are added to the solution and mixed until a uniform dispersion is formed. Greige goods are dipped in the dispersion and then dried at about 30° C. at a relative humidity of at least 50 percent for about 1 hour.

A methyl vinyl silicone rubber stock catalyzed with 2,4-dichlorobenzoyl peroxide is applied to the coated substrate, press cured for about 10 minutes at 116° C. and then postcured for an additional 4 hours at about 205° C. The bond between the silicone rubber and the substrate is measured by the conventional stripping test, ASTM D429–58, Method "B" Modified 180°. The results shown in Table V illustrate cohesive failure of the silicone rubber in a majority of the tests.

TABLE V

Bond Strength (p.p.i.)

| Substrate | Press cured, 10 min./ 116° C. | Postcured, 4 hrs./ 205° C. |
| --- | --- | --- |
| Nylon | 34(c) | 36(c) |
| Nomex [1] | 25(c) | 32(c) |
| Dacron | 25(c) | 25(c) |
| Asbestos | 17(a) | 20(a/c) |
| Glass fiber | 25(c) | 25(c) |

[1] DuPont trademark.
NOTE.—See footnotes (a) (c) (a/c) bottom of Table I.

EXAMPLE 4

A primer composition is prepared by adding 15 parts of vinyltriacetoxysilane to 80 parts of toluene with agitation. A fabric is dipped in the solution and then dried at 30° C. in a relative humidity of at least 50 percent for 1 hour.

A methyl vinyl silicone rubber stock catalyzed with 2,4-dichlorobenzoyl peroxide is applied to the coated fabric, press cured for 10 minutes at 116° C., and then postcured for 4 hours at 205° C. The bond strength between the silicone rubber and fabric is measured by the conventional stripping test, ASTM D429–58, Method "B" Modified 180°. The results of these tests which are illustrated in Table VI show an adhesive failure between the silicone rubber and the substrate.

TABLE VI

Bond Strength (p.p.i.)

| Substrate | Press cured, 10 min./ 116° C. | Postcured, 4 hrs./ 205° C. |
|---|---|---|
| Nylon | 15(a) | 12(a) |
| Nomex[1] | 10(a) | 8(a) |
| Dacron | 6(a) | 4(a) |
| Asbestos | 13(a) | 9(a) |
| Glass fiber | 12(a) | 12(a) |

[1] DuPont trademark.
(a) Adhesive failure.

It is obvious from a comparison of the above examples that a primer composition comprising a silicone polymer, an alkenyl acyloxysilane and catalyst provides for improved adhesion when compared with a primar composition consisting solely of an alkenyl acyloxysilane.

When the above examples are repeated in which isopropenyltriacetoxysilane, 1-hexenyltriacetoxysilane, 1-octenyltriacetoxysilane, vinyltripropionyloxysilane, and isopropenyltrivaleryloxysilane are substituted for vinyltriacetoxysilane in combination with other heat curable silicone rubbers, such as methyl phenyl vinyl silicone rubber, the adhesion between the fabrics and the silicone rubbers are equally as good as those of the specified examples.

Although specific examples of the invention have been described herein, other variations and modifications falling within the spirit and scope of the appended claims are to be included therein.

The invention claimed is:

1. A primer solution for bonding heat curable silicone rubber compositions to substrates consisting essentially of a silicone polymer which is substantially free of hydroxyl groups and consists of hydrocarbon radicals, halogenated hydrocarbon radicals, silicon and oxygen atoms and has recurring structural units of the formula R″₂SiO, in which the ratio of R″ groups to Si atoms is from 1.9 to 2.0 and from 0.01 to about 5.0 mol percent of the R″ groups are unsaturated and the remaining R″ groups are selected from the class consisting of hydrocarbon and halogenated hydrocarbon groups, an organic peroxide curing catalyst, a silane of the formula:

$$R_nSi(OOCR')_{4-n}$$

wherein R is an alkenyl radical having from 1 to 10 carbon atoms; R' is an alkyl radical having from 1 to 5 carbon atoms; and n is an integer of from 1 to 2 and an inert organic solvent selected from the class consisting of aliphatic, aromatic and halogenated aliphatic and aromatic hydrocarbons.

2. The composition of claim 1 wherein the silane and the silicone polymer are each present in an amount of from 1 to 30 percent by weight based on the weight of the composition.

3. The composition of claim 1 wherein the silicone polymer contains recurring structural units of the formula:

in which 0.05 mol percent of the R″ groups are vinyl radicals and the remaining R″ groups are selected from the group consisting of hydrocarbon radicals and fluorinated hydrocarbon radicals.

4. The composition of claim 1 wherein R is a vinyl group and R' is a methyl group.

References Cited

UNITED STATES PATENTS

| 3,264,258 | 8/1966 | Ceyzeriat | 260—46.5 |
| 3,474,064 | 10/1969 | Hittmair et al. | 260—37 |
| 3,325,449 | 6/1967 | Ceyzeriat et al. | 260—46.5 |

DONALD E. CZAJA, Primary Examiner

M. I. MARQUIS, Assistant Examiner

U.S. Cl. X.R.

161—193, 206, 207, 213, 227; 260—33.8 SB, 37 SB, 46.5 G